Patented Dec. 22, 1925.

1,566,840

UNITED STATES PATENT OFFICE.

EDWARD L. DILLMAN, OF JAMAICA, NEW YORK.

METHOD OF MAKING DENTAL PLATES.

No Drawing.   Application filed November 25, 1924.   Serial No. 752,275.

*To all whom it may concern:*

Be it known that I, EDWARD L. DILLMAN, a citizen of the United States, and a resident of the city of New York, Jamaica, borough of Queens, in the county of Queens and State of New York, have invented a new and Improved Method of Making Dental Plates, of which the following is a full, clear, and exact description.

The present invention relates to new and useful improvements in methods of making dental plates, and while the invention is adaptable to the manufacture of dental plates from any of the well-known materials from which dental plates are constructed, it particularly lends itself to the manufacture of so-called porcelain dental plates.

Great difficulty is experienced in the manufacture of dental plates from porcelain for the reason that after the plate has been baked upon the model or mold, owing to its inherent lack of resiliency, removal of the plate from the model or mold without damage to the plate is very difficult.

It is one of the primary objetcs of the invention to provide a new and improved method of making porcelain dental plates whereby the finished plate may be readily removed from the model or mold.

It is a further object of the invention to provide a method of manufacturing dental plates in which certain operations attendant present methods are eliminated.

Heretofore in the manufacture of porcelain dental plates sheets of precious metal were interposed between the porcelain and the mold, and it is a further object of the present invention to provide a method in which these sheets of precious metal may be in the form of very thin foil as distinguished from the other sheets which are relatively considerably thicker than foil, and require a process of swedging to adapt it to the model.

In carrying out the present invention, a plastic model of rare earth is made. This model is formed in the ordinary manner and is of a contour corresponding to that of the mouth for which the plate is to be made. After the plastic model has been completed, it is covered with a relatively thin metallic foil. After the model has been covered with the thin metallic foil, a porcelain compound is built up thereon and the teeth are anchored in the porcelain. The entire article, that is, the model, porcelain, and the teeth, with the metallic foil interposed between the model and the porcelain, is placed in a suitable oven and "fired" until the porcelain is fused. After the porcelain has been fused, it is allowed to set and cool, after which it is carried through the several "firings" and coloring operations common in the art. When the structure has been brought to this point, it becomes necessary to remove the plate from the model without damage to the plate. This is done in the following manner:

I have determined by actual experience that certain compositions including rare earths are soluble in water, and it is a composition of this nature which I employ in the manufacture of the plastic model heretofore mentioned. To remove the plastic model from the plate, it is only necessary to apply the required amount of moisture thereto and the model will readily dissolve, after which the metallic foil is removed from the plate, leaving the plate intact. This method permits of the removal of the plate from the model without danger of injury to the plate.

The foregoing method eliminates two common steps in the manufacture of porcelain dental plates, that is, the making of a die and a counterdie. Furthermore, the employment of the heretofore described method permits of the use of foil instead of metallic sheets, which is an appreciable item in that the metal used is generally one of the metals of the precious groups, and, therefore, entails considerable expense in its use.

What is claimed is:

1. The method of forming dental plates from fusible material, which consists in forming a model of a material soluble in the presence of moisture, subsequently forming the porcelain plate thereon, fusing the porcelain plate and the model, and subsequently removing the model by adding moisture thereto and causing disintegration thereof.

2. The method of forming dental plates, which consists in providing a model of plastic material soluble in the presence of moisture, covering said model with a relatively thin metallic foil, building up the porcelain base upon said model, firing the model and porcelain base, subsequently removing the model from the finished plate by causing disintegration thereof in the presence of moisture, and subsequently removing the metallic foil from the plate.

EDWARD L. DILLMAN.